(12) United States Patent
Brockway

(10) Patent No.: US 6,273,516 B1
(45) Date of Patent: Aug. 14, 2001

(54) SELF-ADJUSTING COMPACTOR WHEEL AND METHOD OF USE

(76) Inventor: Robert J. Brockway, W. 6397 Judy Dr., Plymouth, WI (US) 53073

( * ) Notice: Subject to any disclaimer, the term of this patent is extended or adjusted under 35 U.S.C. 154(b) by 0 days.

(21) Appl. No.: 09/322,100

(22) Filed: May 28, 1999

Related U.S. Application Data

(63) Continuation-in-part of application No. 08/903,167, filed on Jul. 30, 1997, now Pat. No. 6,042,192.

(51) Int. Cl.$^7$ ..................................................... B60B 15/02
(52) U.S. Cl. .............................................. 301/43; 404/121
(58) Field of Search ............................. 301/41.1, 43, 52; 305/107, 100, 110, 115; 404/121

(56) References Cited

U.S. PATENT DOCUMENTS

| | | | |
|---|---|---|---|
| 755,770 | * | 3/1904 | Harrold .................................. 301/43 |
| 1,431,203 | * | 10/1922 | Whitehead ............................. 301/43 |
| 1,501,937 | * | 7/1924 | Benjamin ............................. 301/41.1 |
| 2,435,783 | * | 2/1948 | Hintze ................................ 301/52 X |
| 3,071,050 | * | 1/1963 | Shatto .................................. 301/43 X |
| 5,330,260 | * | 7/1994 | Freeman ................................. 305/110 |
| 5,769,507 | * | 6/1998 | Brockway ............................... 301/43 |

* cited by examiner

Primary Examiner—Russell D. Stormer

(57) ABSTRACT

A compactor wheel that is mountable on an axle of a compaction machine and that automatically adjusts for compacting low density and high density refuse. The compactor wheel is effectively wide when compacting low density material and narrower when compacting higher density material. The compactor wheel includes a hub, a rim and a plurality of cleats. The rim is mounted around the outer circumference of the hub and has a face with at least one smaller diameter section and at least one larger diameter section. The cleats are mounted to the larger diameter section(s) of the face. The one or more larger diameter sections of the face enable the compactor wheel to concentrate the weight of the compaction machine while the compaction machine is compacting relatively high density material. At the same time, the one or more smaller diameter sections of the face enable the compactor wheel to disperse the weight of the compaction machine over more surface area while the compaction machine is compacting relatively low density material.

20 Claims, 2 Drawing Sheets

SELF-ADJUSTING COMPACTOR WHEEL AND METHOD OF USE

RELATED APPLICATIONS

The present application is a continuation-in-part to U.S. patent application Ser. No. 08/903,167, filed Jul. 30, 1997 now U.S. Pat. No. 6,042,192, and entitled SELF-ADJUSTING COMPACTOR WHEEL.

FIELD OF THE INVENTION

The present invention relates to compaction machines, such as those used to compact landfills, more particularly, to the compactor wheels on such a compaction machine and, even more particularly, to a self-adjusting compactor wheel capable of compacting both low density and high density refuse and method of use.

BACKGROUND OF THE INVENTION

Compaction machines are used to compact landfill sites, garbage dumps and other such locations. These machines typically include a self-propelled vehicle having three or four large wheels made of steel. Each wheel has a hub mounted to one end of an axle and a rim disposed around and radially out from the hub. The rim typically includes an outer wrapper defining the width of the wheel. A plurality of cleats are usually mounted on the outer wrapper. In the past, to achieve the highest density possible for the refuse being compacted, compactor wheels having different widths have been used.

Relatively narrow compactor wheels have been used to produce greater compacting pressures (i.e., PLI or pounds per linear inch) and, thereby, higher refuse densities. Being able to achieve higher refuse densities extends the life of the landfill site, garbage dump or other such location. Such narrow compactor wheels are typically used to compact relatively high density refuse (e.g., clay, foundry sand, etc.). Such narrow compactor wheels have been too narrow to support the weight of the compaction machine as it travels over refuse that is loose or has too low of a density (e.g., plastic bags, paper products, food waste, etc.). As a result, if they are too narrow, the narrow compactor wheels can get bogged down in such loose or low density refuse causing the compaction machine to work less efficiently and to get stuck continuously.

In order to ensure the highest degree of compaction and to help avoid getting compaction machines stuck in the refuse, a landfill operator is often forced to purchase two sets of compactor wheels for each compaction machine. The same compaction machine is then used to compact both low and high density refuse. One set of wide wheels is used to compact the loose and low density refuse until the refuse reaches a density capable of supporting the narrow wheels. Then, the set of narrow wheels is used to compact higher density refuse.

One problem with this arrangement is that the landfill operator has to incur the additional cost of an extra set of compactor wheels. In addition, there are significant maintenance costs associated with the wheels of a compaction machine. Removing the compactor wheels is a labor intensive and time consuming process. Compactor wheels can have an outside diameter of up to 84 inches and weigh up to five tons per wheel. It can take up to two working days or more to remove and replace the wheels of a typical compaction machine. Such down time can also result in lost income from refuse left uncompacted. In addition, most landfill sites do not have backup compaction machines available to take over during the down times. The operator of a landfill can risk being charged federal and state fines for each day the trash at the site remains uncompacted.

Accordingly, there is a need for a way to eliminate having to keep a set of narrow and a set of wide compactor wheels for each compaction machine in order to compact both low density and high density refuse.

SUMMARY OF THE INVENTION

The present invention satisfies this need by providing a compactor wheel that is mountable on an axle of a compaction machine and that automatically adjusts for compacting loose or low density refuse and high density refuse. The present compactor wheel is effectively wide when operating in loose or low density material and narrower when the compacted material has reached a density sufficient to support the narrower wheel in order to apply greater compaction pressures to the refuse material. The present invention also enables landfill sites, and other such sites, which initially contain high density materials to be further compacted without having to replace the compactor wheels on a compaction machine with narrower wheels. Because the present compactor wheel can be used with either type of refuse, only one set of compactor wheels is needed for each compaction machine. In addition, the present compactor wheels can significantly increase the ability of a compaction machine to compact refuse, compared to other compactor wheels. For example, depending on the size of the present compactor wheels being used, the density of refuse being compacted with the present wheels has been seen to increase up to as much as 28 percent.

In one aspect of the present invention, a compactor wheel is provided that includes a front side and a back side with a hub, a rim and a plurality of cleats. The hub is mountable to the axle of a compaction machine. The rim is mounted around the outer circumference of the hub and has a face with at least one smaller diameter section and at least one larger diameter section. A side wall connects one smaller diameter section and one larger diameter section so as to form a step. The side wall has a truncated cone-shape. The cleats are mounted to the larger diameter section(s) of the face. The one or more smaller diameter sections of the face enable the compactor wheel to disperse the weight of the compaction machine over more surface area while the machine is compacting relatively loose or low density material. After the loose refuse has been sufficiently compacted, the compaction machine will ride up onto the one or more larger diameter sections of the face, thereby enabling the compactor wheel to concentrate the weight of the compaction machine and further compact the already compacted refuse to a higher density.

Put another way, the one or more larger diameter sections of the face define a first surface area, and the one or more smaller diameter sections of the face define a second surface area. When compacting looser or lower density refuse material, the second surface area provides additional area of the wheel face in contact with the refuse material to reduce the pressure applied by the compaction machine during the compaction of the lower density material. Once the refuse material is sufficiently compacted to support the additional pressure, the area of the wheel face in contact with the refuse material decreases to only the first surface area.

The at least one smaller diameter section of the present compactor wheel can include two smaller diameter sections, with one of the two smaller diameter sections located on the front side and the other of the two smaller diameter sections located on the back side of the compactor wheel. It may be desirable for the at least one larger diameter section to include two larger diameter sections located between the front side and the back side of the wheel and for a smaller diameter section to be located between the two larger diameter sections.

The face of the rim can be defined by an outer wrapper which includes at least one side wall. Each side wall separates one smaller diameter section from one larger diameter section, thereby forming a step. It is desirable for the outer wrapper to include at least two side walls, with the side walls forming two steps. One step is located on the front side, and the other step is located on the back side.

It is desirable for the cleats to be tooth shaped for demolishing, breaking up or disintegrating and compacting refuse material, and thereby enable the compaction machine to compact the refuse to higher densities. It is also desirable for the compactor wheel to have an enclosed metal plate construction sufficient to bare the weight of a compaction machine body weighing tens of thousands of pounds.

The present compactor wheel can also include an axle guard system in the form of a circumferential barrier for preventing, or at least substantially inhibiting, cable, rope, wire and other refuse and debris from wrapping around the portion of the compaction machine axle located behind the compactor wheel. This circumferential barrier can be formed by extending all or sections of a side wall, forming a step on the back side of the compactor wheel, above the corresponding larger diameter section of the face. Alternatively, the circumferential barrier can be a separate element (e.g., a washer shaped ring or separate fins or plates) mounted to the side wall so as to extend above the larger diameter section of the face of the wheel and thereby form an axle guard system.

In another aspect of the present invention, a compaction machine is provided for compacting both low and high density refuse material. The present compaction machine is sufficiently supported when compacting lower density refuse materials while also being able to compact refuse materials to higher densities. The compaction machine includes at least one of the above described compactor wheels. It is desirable for the present compaction machine to include a full complement of the compactor wheels according to the present invention (i.e., typically three to four wheels).

In a further aspect of the present invention, a method is provided comprising: providing a compactor wheel comprising a hub mountable to an axle of a compaction machine, a rim mounted around the outer circumference of the hub, the rim having a face with at least one larger diameter section and at least one smaller diameter section suitable for compacting higher and lower density refuse material, and a plurality of cleats mounted to the larger diameter section of the face; and mounting the compactor wheel on the axle of a compaction machine having a body suitable for highly compacting refuse material. The method can further comprises: compacting refuse material with the compaction machine mounting a plurality of the compactor wheel.

The objectives, features and advantages of the present invention will become apparent upon consideration of the detailed description and the appended drawings.

DETAILED DESCRIPTION OF THE INVENTION

Although the present invention is herein described in terms of specific embodiments, it will be readily apparent to those skilled in this art that various modifications, re-arrangements, and substitutions can be made without departing from the spirit of the invention. The scope of the present invention is thus only limited by the claims appended hereto.

Figure 1:
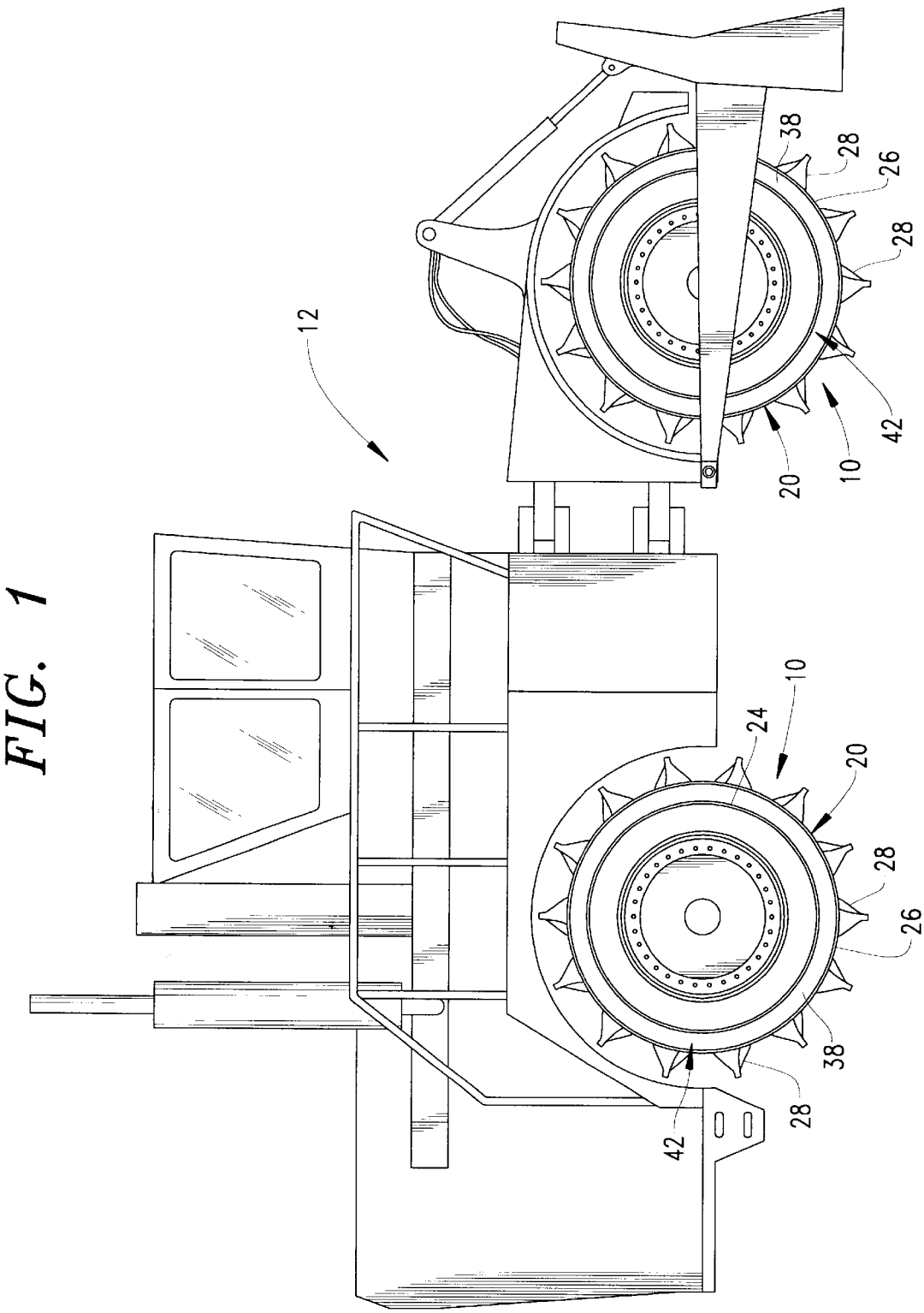
FIG. 1 is a side view of one type of compaction machine mounting compactor wheels according to one embodiment of the present invention, with the front side of the wheels being shown.
Figure 3:
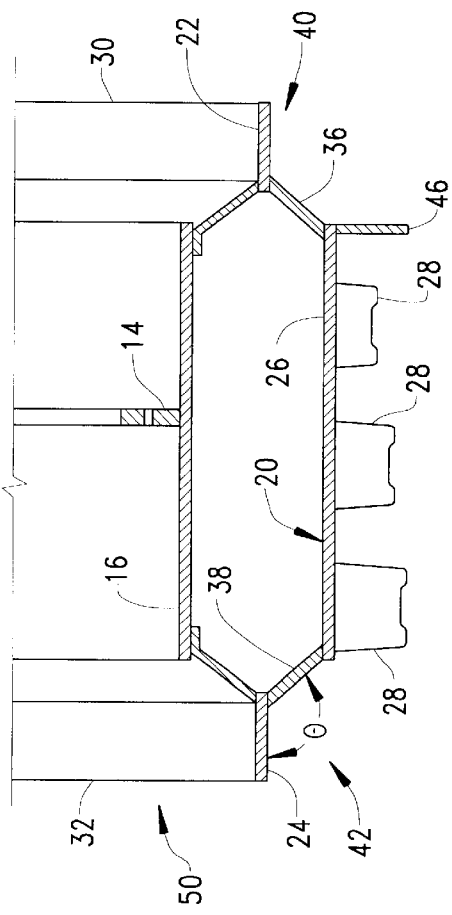
FIG. 3 is a sectional view, taken along lines 3—3, of the compactor wheel of FIG. 2.
Figure 2:
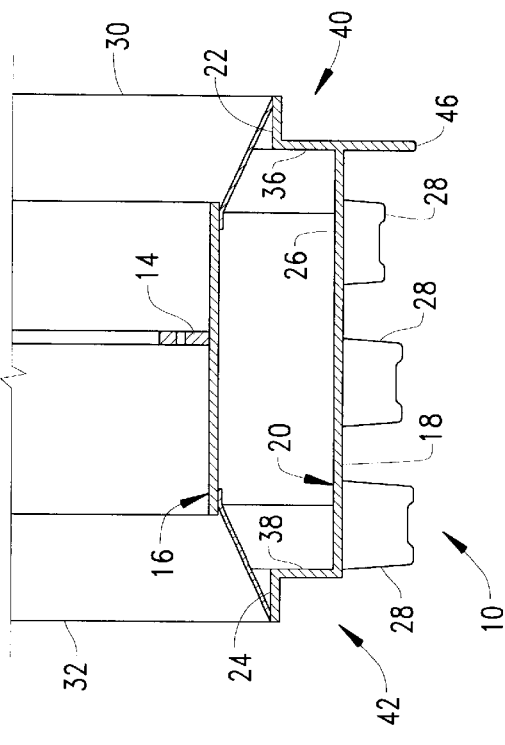
FIG. 2 is an enlarged side view of one of the compactor wheels mounted on the compaction machine of FIG. 1.

Referring to FIGS. 1–3, a compactor wheel 10 according to one embodiment of the present invention is shown mounted on the axle of a compaction machine 12. The present invention is not intended to be limited to any particular type of compaction machine and may be used on any suitable compaction machine. The wheel 10 includes a ring washer shaped hub 14 adapted, for example, with a plurality of bolt holes for being bolted or otherwise mounted to the axle of the machine 12. A rim 16, in the form of a tubular ring or band, is mounted around the outer circumference of the hub 14. An outer wrapper 20 is mounted around the rim 16. The wrapper 20 has a circumferential outer face or surface 18 defined by two smaller diameter tubular ring or band shaped sections 22 and 24 and one larger diameter tubular ring or band shaped section 26. A plurality of cleats 28 are mounted on the face 18 of the larger diameter section 26. As shown in FIGS. 1–3 and only by way of example, the cleats 28 are all the same height and in a general, chevron, or any other suitable pattern. The cleats 28 can be mounted in any of a variety of patterns, as desired.

The additional surface area of the face 18 provided by two smaller diameter sections 22 and 24 enable the compactor wheel 10 to disperse the weight of the compaction machine 12 over more surface area while the machine 12 is compacting relatively loose or low density refuse material. After the loose refuse has been sufficiently compacted, the compaction machine 12 will ride up onto the face 18 of the larger diameter section 26, thereby enabling the compactor wheel 10 to concentrate the weight of the compaction machine 12 and further compact the already compacted refuse to a higher density. The compactor wheel 10 also enables landfill sites, and other such sites, which initially contain high density refuse materials to be further compacted without having to replace the compactor wheels on a compaction machine with narrower wheels.

Put another way, the face 18 of the larger diameter section 26 defines a first surface area, and the faces 18 of the two smaller diameter sections 22 and 24 define a second surface area. When compacting looser or lower density refuse material, the second surface area provides additional area of the wheel face 18 in contact with the refuse material to reduce the pressure applied by the compaction machine 12 during the compaction of the lower density material. Once the refuse material is sufficiently compacted to support the additional pressure, the area of the wheel face 18 in contact with the refuse material decreases to only the first surface area. The first surface area of this wheel embodiment is equal to the width of section 26 multiplied by its circumference. The second surface area of this wheel embodiment is equal to the width of section 22 multiplied by its circumference plus the width of section 24 multiplied by its circumference.

For the exemplary wheel 10 of FIGS. 1–3, the smaller diameter sections 22 and 24 each have a significantly smaller width than that of the larger diameter section 26. For this wheel 10, it is believed desirable for each of the smaller diameter sections 22 and 24 to have a width that is up to about 25% of the overall width of the wheel 10 (i.e., the widths of sections 22, 24 and 26 combined). Put in another way, it is believed desirable for the overall width of the smaller diameter sections of the present compactor wheel to be up to about 50% of the overall width of the wheel (i.e., of all the smaller and larger diameter sections), depending on the size of the wheel 10. The larger the wheel 10, the more of the smaller diameter section(s) can make up the overall width of the wheel 10. The larger diameter section(s) must provide enough surface area to properly mount a sufficient number of cleats 28. At the same time, the diameter of the larger diameter section(s) is limited by the desired clearance between the cleats 28 and the wheel well of the compaction machine body. In addition, the overall width of a compactor wheel is limited by the length of the compaction machine axle and the desired clearance between the backside of the compactor wheel and the body of the compaction machine.

The smaller diameter section 22 is located on the back side 30 of the compactor wheel 10, and the other smaller diameter section 24 is located on the front side 32 of the wheel 10. The larger diameter section 26 is located between the sections 22 and 24. The outer wrapper 20 of the exemplary wheel 10 of FIGS. 1–3 includes two side walls 36 and 38. The side walls 36 and 38 connect and separate the larger diameter sections 26 from the smaller diameter sections 22 and 24, respectively. The side wall 36 and the section 22 form a back side step 40, and the side wall 38 and the section 24 form a front side step 42. Each of these steps 40 and 42 tends to inhibit movement of the material being compacted into the hub area of the wheel 10.

Initially, when the density of the material being compacted is low enough, the wheel 10 sinks down into the material until its full width (i.e., sections 22, 24 and 26) contacts the material. With really low density material, the wheel 10 might even sink down past the smaller diameter sections 22 and 24. As the machine 12 is driven across the site (e.g., a landfill site) over and over again, the density of the material increases. Eventually, the density of the compacted material increases to the point that the smaller diameter sections 22 and 24 rise above the material and the machine 12 rides only on the larger diameter section 26. Since the contact surface area of the wheel 10 is reduced when only the larger diameter section 26 makes contact, the compaction machine 12 is able to bring greater pressure to bear in compacting the material.

By way of example only, and not as a limitation, for a compaction machine weighing 80,000 to 100,000 pounds and having four of the wheels 10 shown in FIGS. 1–3, each wheel can have an outside diameter in the range of from about 58 inches to 84 inches and an overall width of about 55 inches. The larger diameter section 26 can have a width ranging from about 40 inches to about 48 inches and each of the smaller diameter sections 22 and 24 can have a width ranging from about 7.5 inches to about 3.5 inches, respectively. The side walls 36 and 38 for this particular exemplary wheel 10 can have a depth of about 4 or 5 inches or more.

The width of each of the smaller diameter sections 22 and 24 can depend on how much support the compaction machine 12 needs while compacting lower density refuse materials or how much force needs to be applied by the machine 12 to produce the desired degree of compaction. Sanitary refuse such as, for example, that typically dumped by residential garbage trucks often contains a lot of plastic bags full of garbage. Such refuse is fluffy and, therefore, would likely require wider sections 22 and 24. In contrast, demolition sites or sites that contain a lot of clay or a lot of foundry sand, need more of the machine weight being applied (i.e., greater applied pressure) and, therefore, narrower sections 22 and 24 would likely suffice. If the trash being compacted is dense and the weight of the compaction machine 10 is needed to tear it apart, then it is desirable for the larger diameter section 26 to be narrower and the side walls 36 and 38 to be deeper. The desired depth of the side walls 36 and 38 can depend on the available clearance underneath the compaction machine 12.

It is desirable for the underside of the machine 12 not to drag on the ground as the machine is operated. If the underside drags, the machine 12 will likely hang up and cause the wheels 10 to spin in place, tearing up the landfill surface just compacted. In addition, it is desirable for the larger diameter section 26 to be wide enough to accommodate the desired number of cleats 28. The number of cleats 28 mounted across the width of the wheel 10 usually varies from seven to four, but may be as few as three or even two. It is desirable for there to be a gap between the cleats 28 to allow the trash and other refuse material to move across the face 18 of the wheel 10. With such a gap, the cleats 28 are more likely to remain clean. The gap between the cleats 28 can typically vary anywhere from an inch from side to side all the way up to 6 to 8 inches from side to side, depending on the cleat pattern.

The present compactor wheel 10 can also include an axle guard system in the form of a circumferential barrier, as disclosed in the present applicant's co-pending U.S. patent application Ser. No. 08/732,901, filed Oct. 17, 1996, now U.S. Pat. No. 5,769,507, entitled COMPACTOR WHEEL AXLE GUARD SYSTEM, assigned to the assignee of the present application and incorporated herein by reference in its entirety. An exemplary barrier 46 is shown in FIG. 3. The barrier 46 can prevent or substantially inhibit cable, rope, wire and other refuse and debris from wrapping around the portion of the compaction machine axle located behind the compactor wheel 10 (i.e., on the backside of the wheel). The illustrated circumferential barrier 46 is formed by extending all or sections (i.e., plate or fin-shaped portions) of the backside side wall 36 radially outward from and above the larger diameter section 26 of the face 18. This barrier 46 as well as the rest of the wheel 10 can be made of any suitable material such as, for example, steel. The barrier 46 can extend radially out from the rim 16 to a height above, equal to, or below the cleats 28 mounted on the wheel 10.

In an exemplary modification, the circumferential barrier 46 can be a separate element such as, for example, a washer shaped ring that looks similar to the side wall 36 and is mounted flush against the surface 18 of the side wall 36, such as by welding or bolting, so as to extend radially out from and above the larger diameter section 26 of the wheel 10 and thereby form an axle guard system. As an alternative, the barrier 46 can be a plurality of separate elements, e.g., fins or plates, that are so mounted against the side wall 36 in a circumferentially spaced manner.

Figure 4:
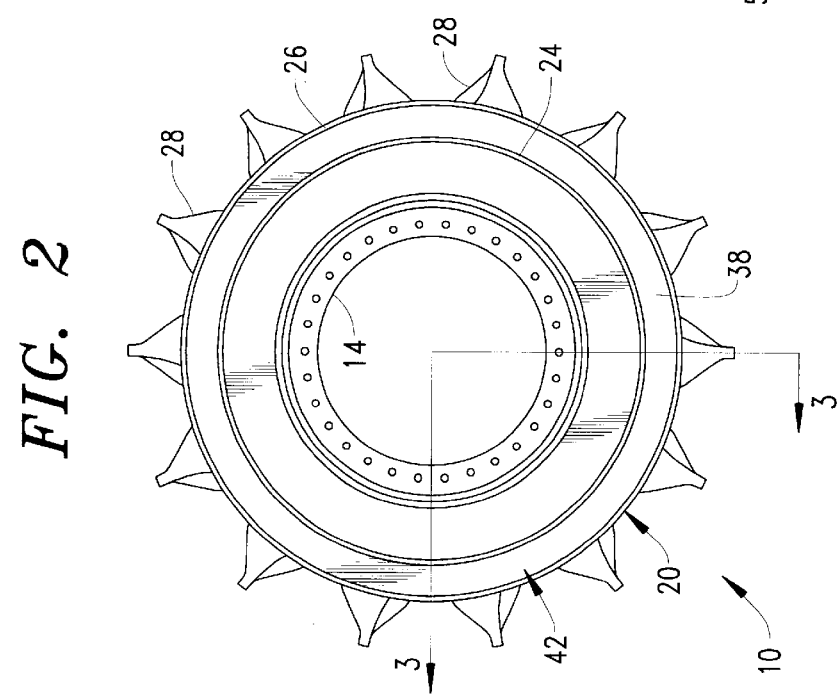
FIG. 4 is a sectional view, similar to that of FIG. 3, of another embodiment of the compactor wheel of the present invention with the cleats not shown.

Referring to FIG. 4, the compactor wheel 10 can be modified to form an embodiment 50 having the smaller diameter section 22 connected to the larger diameter section 26 by a side wall 36 that has a truncated cone-shape and the smaller diameter 24 connected to the larger diameter section 26 by a side wall 38 that has a truncated cone-shape. In FIG. 4, the cleats 28 are not shown, but would be mounted on the face 18 of the larger diameter section 26. The truncated cone-shaped side wall 36 and section 22 and the truncated cone-shaped side wall 38 and section 24 form the steps 40 and 42, respectively. For each step 40 and 42, the cross-section of the corresponding smaller diameter section 22 and 24 is at an obtuse angle Θ from the cross-section of the corresponding truncated cone-shaped side wall 36 and 38, respectively. This obtuse angle Θ is in the range of from over 90° up to about 170°, and preferably from about 110° up to about 150°. When a truncated cone-shaped side wall is used for a typical wheel 10, it is desirable for the smaller diameter section and larger diameter section to be separated, radially, by at least four inches. It may be desirable for one or the other, but not both, of the side walls 36 and 38 to have such a truncated cone-shape.

Refuse material such as, for example, cover materials (e.g., dirt), clay, mud, human waste, and the like can accumulate in steps 40 and 42 that have an angle Θ of 90° or less (see FIG. 3). The use of truncated cone-shaped side walls 36 and/or 38 (see FIG. 4) has been found to substantially reduce (by over 75% to up to about 90%), if not almost completely eliminate, the accumulation of such refuse material in the corresponding steps 40 and 42. With operating landfills, after a specified amount of compacting has occurred, the compacted refuse is typically covered with a layer of, for example, dirt or some other cover material.

From the above disclosure of the general principles of the present invention and the preceding detailed description, those skilled in this art will readily comprehend the various modifications to which the present invention is susceptible. For example, with one modification to the wheel embodiment of FIGS. 1–3, the larger diameter section 26 could be separated into two sections by a third smaller diameter section located therebetween. A circumferential row of the cleats 28 may need to be removed when such a third smaller diameter section is employed. In addition, an axle guard system like the circumferential barrier 46, or any other of those described above, can be mounted on the inside edge of the larger diameter section 26.

The scope of the invention should be limited only by the following claims and equivalents thereof.

What is claimed is:

1. A compactor wheel mountable on an axle of a compaction machine suitable for compacting higher density and lower density refuse material, said compactor wheel comprising:
   a hub mountable to an axle of a compaction machine;
   a rim mounted around the outer circumference of said hub, said rim having a face with a smaller diameter section and a larger diameter section, and a side wall connecting said smaller diameter section and said larger diameter section so as to form a step, said side wall having a truncated cone-shape; and
   a plurality of compaction cleats mounted to said larger diameter section of said face, said cleats being suitable for compacting refuse material,
   wherein said wheel includes a front side, a back side and an axle guard system, with said step being on said front side, said axle guard system being on said larger diameter section along said back side, and said axle guard system substantially inhibiting cable, rope and wire from wrapping around the portion of the compaction machine axle located on the back side of said wheel.

2. The compactor wheel as set forth in claim 1, wherein said wheel includes another smaller diameter section, with one smaller diameter section located on said front side and the other smaller diameter section located on said back side, and each smaller diameter section is connected to said larger diameter section by one said side wall.

3. The compactor wheel as set forth in claim 1, wherein said wheel includes a circumferential barrier, said circumferential barrier being mounted to said larger diameter section along said back side so as to extend above said face and form said axle guard system.

4. The compactor wheel as set forth in claim 1, wherein said side wall is connected to said smaller diameter section at an obtuse angle Θ in the range of from over 90° up to about 170°.

5. The compactor wheel as set forth in claim 1, wherein said side wall is connected to said smaller diameter section at an obtuse angle Θ in the range of from about 110° up to about 150°.

6. The compactor wheel as set forth in claim 1 in combination with a compaction machine for compacting higher density refuse material and lower density refuse material, said compaction machine comprising:
   at least one axle; and
   at least one of said compactor wheel mounted on said axle.

7. The combination as set forth in claim 6, wherein said smaller diameter section of said enables said compactor wheel to disperse the weight of said compaction machine over more surface area while said compaction machine is compacting relatively low density refuse material and, once the relatively low density refuse material is sufficiently compacted, said larger diameter section of said face enables said compactor wheel to concentrate the weight of said compaction machine to further compact the refuse material to a higher density.

8. The combination as set forth in claim 6, wherein said wheel has a front side and a back side, said at least one smaller diameter section includes two smaller diameter sections, with one of said two smaller diameter sections located on said front side and the other of said two smaller diameter sections located on said back side, and each smaller diameter section is connected to one larger diameter section by one said side wall.

9. The combination as set forth in claim 6, wherein said wheel includes a back side and a circumferential barrier, said circumferential barrier being mounted to said larger diameter section along said back side so as to extend above said face and form an axle guard system.

10. The combination as set forth in claim 6, wherein said side wall is connected to said smaller diameter section at an obtuse angle Θ in the range of from over 90° up to about 170°.

11. The combination as set forth in claim 6, wherein said side wall is connected to said smaller diameter section at an obtuse angle Θ in the range of from about 110° up to about 150°.

12. The combination as set forth in claim 11, wherein said compaction cleats extend to a height inches above said face and are sufficiently tooth shaped for demolishing, breaking up or disintegrating and compacting low density refuse material, such as plastic products, paper products and food waste, and thereby enable said compaction machine to compact the low density refuse to higher densities, and said compactor wheel has an enclosed metal plate construction sufficient to bare the weight of a compaction machine body weighing tens of thousands of pounds.

13. A method comprising:

providing a compactor wheel comprising a hub mountable to an axle of a compaction machine, a rim mounted around the outer circumference of the hub, the rim having a face with at least one larger diameter section and at least one smaller diameter section suitable for compacting higher and lower density refuse material, and a plurality of cleats mounted to the larger diameter section of the face; and mounting the compactor wheel on the axle of a compaction machine having a body suitable for highly compacting refuse material.

14. The method as set forth in claim 13, further comprising:

compacting refuse material with the compaction machine mounting a plurality of the compactor wheel.

15. The method as set in claim 14, wherein said step of compacting refuse material includes driving the compaction machine over relatively low density refuse material such that the smaller diameter section of the face contacts and participates in the compaction of the refuse material and the low density refuse material is compacted to a relatively higher density, then continuing to drive the compaction machine over the higher density refuse material such that only the larger diameter section of the face participates in the compaction of the refuse material and the higher density refuse material is compacted to an even higher density.

16. A compactor wheel mountable on an axle of a compaction machine suitable for compacting higher density and lower density refuse material, said compactor wheel comprising:

a hub mountable to an axle of a compaction machine;

a rim mounted around the outer circumference of said hub, said rim having a face with only one smaller diameter section and one larger diameter section, and a side wall connecting said smaller diameter section and said larger diameter section so as to form a step, said side wall having a truncated cone-shape; and a plurality of tooth shaped compaction cleats mounted to said larger diameter section of said face, said cleats being suitable for compacting low density refuse material such as plastic products, paper products and food waste, wherein said wheel includes a front side, with said step being on said front side.

17. The compactor wheel as set forth in claim 16, wherein said wheel includes a back side and an axle guard system on said larger diameter section along said back side, said axle guard system substantially inhibits cable, rope and wire from wrapping around the portion of the compaction machine axle located on the back side of said wheel.

18. The compactor wheel as set forth in claim 16 in combination with a compaction machine for compacting higher density refuse material and lower density refuse material, said compaction machine comprising:

at least one axle; and at least one of said compactor wheel mounted on said axle.

19. The compactor wheel as set forth in claim 16, wherein said plurality of compaction cleats are mounted in at least three rows of cleats, each said row of cleats extending along the circumference of said larger diameter section of said face.

20. The method of claim 15, wherein the low density refuse material being compacted includes at least one from the group consisting of plastic products, paper products and food waste.

* * * * *